United States Patent
Yang (10) Patent No.: US 11,395,165 B2
(45) Date of Patent: Jul. 19, 2022

(54) METHOD FOR CONFIGURING USER EQUIPMENT MEASUREMENT PARAMETERS AND USER EQUIPMENT

(71) Applicant: Guangdong OPPO Mobile Telecommunications Corp., Ltd., Guangdong (CN)

(72) Inventor: Ning Yang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/886,375

(22) Filed: May 28, 2020

(65) Prior Publication Data
US 2020/0296610 A1 Sep. 17, 2020

Related U.S. Application Data

(63) Continuation of application No. PCT/CN2017/115492, filed on Dec. 11, 2017.

(51) Int. Cl.
*H04W 72/04* (2009.01)
*H04W 24/08* (2009.01)
*H04L 43/50* (2022.01)

(52) U.S. Cl.
CPC ............ *H04W 24/08* (2013.01); *H04L 43/50* (2013.01)

(58) Field of Classification Search
CPC ......... H04W 24/08; H04L 43/50; H04B 17/00
See application file for complete search history.

(56) References Cited

U.S. PATENT DOCUMENTS

| | | | | |
|---|---|---|---|---|
| 2012/0115463 | A1* | 5/2012 | Weng | H04B 17/318 455/425 |
| 2014/0155049 | A1* | 6/2014 | Hamilton | H04B 17/382 455/418 |
| 2014/0248840 | A1* | 9/2014 | Karri | H04W 48/16 455/67.11 |
| 2017/0094543 | A1* | 3/2017 | Narasimha | H04W 16/14 |
| 2018/0206138 | A1* | 7/2018 | Hayashi | H04W 72/04 |
| 2018/0359149 | A1* | 12/2018 | Shaheen | H04W 72/0453 |

(Continued)

FOREIGN PATENT DOCUMENTS

| CN | 102388646 A | 3/2012 |
|---|---|---|
| CN | 102457894 A | 5/2012 |

(Continued)

OTHER PUBLICATIONS

Nokia, On the need of multiple filter coefficients in NR, Nov. 27-Dec. 1, 2017, 3GPP TSG-RAN WG2 #100, R2-1713263, pp. 1-2, 5-8 (Year: 2017).*

(Continued)

*Primary Examiner* — Hassan Kizou
*Assistant Examiner* — Mahbubul Bar Chowdhury
(74) *Attorney, Agent, or Firm* — Bayes PLLC (57) ABSTRACT

A method for configuring measurement parameters of user equipment (UE), UE, and a computer storage medium are provided. The method includes obtaining a filter coefficient list configured by a network; wherein the filter coefficient list comprises one or more filter coefficients. The method further includes obtaining a filter coefficient from the filter coefficient list for a measurement object based on indication information of the measurement object.

6 Claims, 4 Drawing Sheets

Obtain information about at least one filter coefficient configured by a network side — 101

Determine, based on related information of a measurement object and the information about the at least one filter coefficient, a target filter coefficient to be used for measurement — 102

(56) References Cited

U.S. PATENT DOCUMENTS

| | | | |
|---|---|---|---|
| 2019/0058508 A1* | 2/2019 | Yiu | ............... H04B 7/0857 |
| 2019/0110299 A1* | 4/2019 | Kim | ............... H04L 5/005 |

FOREIGN PATENT DOCUMENTS

| | | | |
|---|---|---|---|
| CN | 103220704 | A | 7/2013 |
| CN | 103404072 | A | 11/2013 |
| CN | 104885511 | A | 9/2015 |
| CN | 105557012 | A | 5/2016 |
| CN | 105766018 | A | 7/2016 |
| CN | 106941693 | A | 7/2017 |
| CN | 107710806 | A | 2/2018 |
| EP | 2741540 | A2 | 6/2014 |
| EP | 2742540 | A2 | 6/2014 |
| EP | 2790440 | A1 | 10/2014 |
| EP | 2800412 | A1 | 11/2014 |
| EP | 3322215 | A1 | 5/2018 |
| EP | 3328118 | A1 | 5/2018 |
| WO | 2016101864 | A1 | 6/2016 |
| WO | 2017010379 | A1 | 1/2017 |
| WO | 2017014229 | A1 | 1/2017 |

OTHER PUBLICATIONS

MediaTek Inc. NR Filter Coefficients for Different Frequencies, Nov. 27-Dec. 1, 2017, 3GPP TSG-RAN WG2 Meeting #100, R2-1713674, pp. 1-6 (Year: 2017).*

MediaTek Inc., [DRAFT] Reporton Email Discussion [99bis#22][NR] Filter, USA, Nov. 27-Dec. 1, 2017, 3GPP TSG-RAN WG2 Meeting #100, R2-1713673 (Year: 2017).*

3rd Generation Partnership Project; Draft TS 38.331 v0.2.0; R2-1713629, Nov. 21, 2017 (Year: 2017).*

ETSI TS 136 331 V14.4.0 (Oct. 2017) Radio Resource Control (RRC); Protocol specification (Year: 2017).*

Nokia, R2-1713263, On the need of multiple filter coefficients in NR, Nov. 27-Dec. 1, 2017 (Year: 2017).*

International Application No. PCT/CN2017/115492, International search report, dated Apr. 28, 2018, 2 pages.

3GPP TS 36.331 14.0.0 RAN2 stage 3 TS issued on Sep. 2016 Section 5.5.2.9.

European Patent Application No. 17934564.0, "Extended European Search Report", dated Aug. 20, 2020, 9 pages.

3GPP, XP050377647, TS 36.331, V8.4.0 issued Dec. 1, 2008, pp. 160-161 of 198 pages.

Communication Pursuant to Article 94(3) EPC issued in corresponding European Application No. 17 934 564.0, dated Apr. 21, 2021, 5 pages.

First Office Action issued in corresponding Chinese Application No. 202010388440.4, dated May 21, 2021, 30 pages.

Request for SIPO Patent Priority Review issued in corresponding Chinese Application No. 202010388440.4, dated Apr. 21, 2021, 6 pages.

Decision of Rejection issued in corresponding Chinese Application No. 202010388440.4, dated Sep. 23, 2021, 27 pages.

The Second Office Action issued in corresponding Chinese Application No. 202010388440.4, dated Aug. 4, 2021, 32 pages.

First Examination Report issued in corresponding India Application No. 202017029485, dated Aug. 1, 2021, 7 pages.

Notification of Reason for Refusal issued in corresponding Korean Application No. 10-2020-7019693, dated Aug. 24, 2021, 15 pages.

Decision of Rejection issued in corresponding Chinese Application No. 02010388440.4, dated Sep. 23, 2021, 27 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0 (Sep. 2017), 753 pages.

Notice of Reasons for Refusal issued in corresponding Japanese Patent Application No. 2020-549845, dated Oct. 29, 2021, 8 pages.

Summons to attend oral proceedings pursuant to Rule 115(1) EPC issued in corresponding European Application No. 17934564.0, dated Nov. 16, 2021, 10 pages.

First Notice of Final Rejection issued in corresponding Korean Application No. 10-2020-7019693, dated Feb. 16, 2022, 8 pages.

Second Notice of Final Rejection issued in corresponding Korean Application No. 10-2020-7019693, dated Apr. 14, 2022, 8 pages.

Decision to refuse a European Patent application issued in corresponding European Application No. 17934564.0, dated Apr. 20, 2022, 18 pages.

Reexamination Notice issued in corresponding Chinese Application No. 202010388440.4, dated Apr. 24, 2022, 24 pages.

* cited by examiner

METHOD FOR CONFIGURING USER EQUIPMENT MEASUREMENT PARAMETERS AND USER EQUIPMENT

CROSS-REFERENCE TO RELATED APPLICATION

This application is a continuation of and claims priority to International Patent Application PCT/CN2017/115492, filed Dec. 11, 2017, the contents of which is hereby incorporated by reference in its entirety.

BACKGROUND OF THE INVENTION

Technical Field

The present invention relates to the field of information processing technology and, in particular, to a method for configuring measurement parameters of user equipment (UE), UE, a network device, and a computer storage medium.

Related Art

In a working mode with tight interworking between Long Term Evolution (LTE) and new radio (NR), a master node (MN) and a slave node (SN) independently configure measurement configurations for UE. For the measurement of filter coefficients, two different filter coefficients are configured only according to whether a measurement quantity is a reference signal received power (RSRP) or a reference signal received quality (RSRQ) in the measurement of each UE in the LTE.

In 5G, NR has a relatively wide spectral range, and signals attenuate differently at different frequencies. For example, when a frequency in NR is high, signal quality of a cell fluctuates widely. Therefore, extra consideration should be given to the impact of a newly measured signal on a final measurement result in the configuration of filter coefficients. Moreover, many factors are considered in the measurement of filter coefficients. For example, different filter coefficients are considered for each measurement object. As a result, heavy signaling load is caused by measurement configuration of filter coefficients. Therefore, it is necessary to design an appropriate configuration method to reduce the signaling load caused by the configuration of filter coefficients.

SUMMARY OF THE INVENTION

To resolve the foregoing technical problems, embodiments of the present invention provide a method for configuring measurement parameters of UE, UE, a network device, and a computer storage medium.

An embodiment of the present invention provides a method for configuring measurement parameters of UE, applied to UE, and including obtaining information about at least one filter coefficient configured by a network side. The method further includes determining, based on related information of a measurement object and the information about the at least one filter coefficient, a target filter coefficient to be used for measurement.

An embodiment of the present invention provides a method for configuring measurement parameters of UE, applied to a network device, and including configuring information about at least one filter coefficient for UE, where the at least one filter coefficient includes at least information about a default filter coefficient.

An embodiment of the present invention provides UE, including a first communications unit, configured to obtain information about at least one filter coefficient configured by a network side. The UE further includes a first processing unit, configured to determine, based on related information of a measurement object and the information about the at least one filter coefficient, a target filter coefficient to be used for measurement.

An embodiment of the present invention provides a network device, including a second communications unit, configured to configure information about at least one filter coefficient for UE, where the at least one filter coefficient includes at least information about a default filter coefficient.

An embodiment of the present invention provides UE, including a processor and a memory configured to store a computer program that can run on the processor, where the processor is configured to execute the computer program to perform the steps of the foregoing methods.

An embodiment of the present invention provides a network device, including: a processor and a memory configured to store a computer program that can run on the processor, where the processor is configured to execute the computer program to perform the steps of the foregoing methods.

An embodiment of the present invention provides a computer storage medium, storing a computer executable instruction, where the computer executable instruction is executed to perform the steps of the foregoing methods.

By means of the technical solutions in the embodiments of the present invention, UE can obtain information about a plurality of filter coefficients configured by a network side. In this way, when the UE needs to be measured, the UE can determine a target filter coefficient based on a measurement object and the information about the plurality of filter coefficients, thereby reducing the signaling load of configuration of filter coefficients when the UE needs to be measured.

DETAILED DESCRIPTION OF THE INVENTION

For more thorough understanding of the characteristics and technical content of the embodiments of the present invention, the following describes implementations of the embodiments of the present invention in detail with reference to the accompanying drawings. The accompanying drawings are only used as a reference for description, but are not intended to limit the embodiments of the present invention.

Embodiment 1

Figure 1:
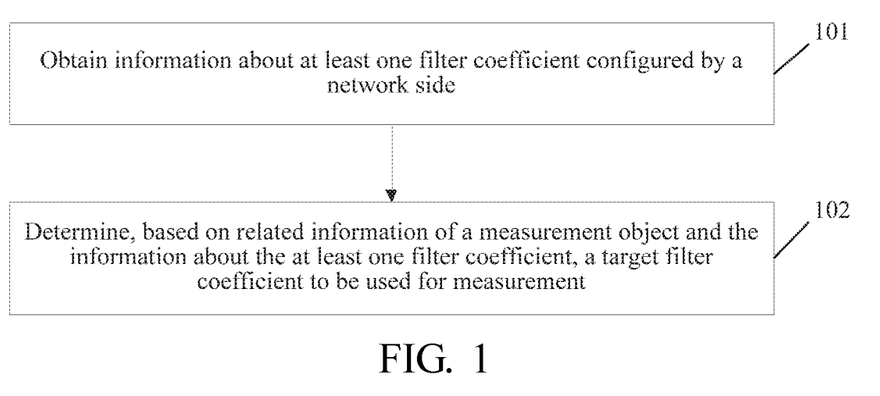
FIG. 1 is a schematic flowchart of a method for configuring measurement parameters of UE according to an embodiment of the present invention.

This embodiment of the present invention provides a method for configuring measurement parameters of UE, applied to UE. As shown in FIG. 1, the method includes the following steps.

Step 101: Obtain information about at least one filter coefficient configured by a network side.

Step 102: Determine, based on related information of a measurement object and the information about the at least one filter coefficient, a target filter coefficient to be used for measurement.

That is, in this embodiment of the present invention, information about a plurality of filter coefficients can be configured on a network side, so that a target filter coefficient to be used is chosen from the information about the plurality of filter coefficients.

The solution provided in this embodiment is specifically described below by using various examples.

Example 1

The at least one filter coefficient includes at least information about a default filter coefficient.

The method further includes: obtaining at least one first reference filter coefficient configured by the network side. It can be understood that each first reference filter coefficient may be set in a plurality of dimensions included in this embodiment. For example, one first reference filter coefficient may be set in each dimension. In this embodiment, dimensions of frequencies may include a low frequency, an intermediate frequency, a high frequency, and an ultra high frequency. Correspondingly, first reference filter coefficients are set in the four dimensions. In addition, the first reference filter coefficients may be different.

In this embodiment, according to frequencies, dimensions of the information about the plurality of filter coefficients include a plurality of grades such as a low frequency, an intermediate frequency, a high frequency, and an ultra high frequency. Different filter coefficients are separately configured and used in three grades, that is, a low frequency, an intermediate frequency, and a high frequency. That is, different filter coefficients correspond to different frequency dimensions, and a plurality of filter coefficients may be set according to different frequencies in each frequency dimension.

The obtaining information about at least one filter coefficient configured by a network side includes obtaining information about a filter coefficient corresponding to each of at least one dimension configured by the network side, where the information about the filter coefficient further includes: an offset value of the filter coefficient relative to the first reference filter coefficient. That is, in the information about the at least one filter coefficient in each dimension, information about each filter coefficient may include the offset value and a first reference filter coefficient that corresponds to the offset value. Certainly, a specific reference filter coefficient may be alternatively not indicated, and a first reference filter coefficient corresponding to each dimension is used to correspond to the offset value by default.

It can be understood that dimension classification methods provided in this example may further include configuring corresponding information about a filter coefficient respectively according to several dimensions for example, <cell, beam>, <RSRP, RSRQ, signal-to-interference-plus-noise ratio (SINR)>, <channel state information reference signal (CSI-SR), synchronization signal block (SSB)>, and <low frequency, intermediate frequency, high frequency, and ultra high frequency>, and the information about the filter coefficient is an offset value of the filter coefficient to be configured relative to the reference filter coefficient.

The default processing method of the foregoing offset value and the first reference filter coefficient may include:

In a first processing method, the offset value may be added to the first reference filter coefficient by default, or may be subtracted from the first reference filter coefficient by default. Certainly, there may be other calculation methods, which are not enumerated herein. That is, an index of the filter coefficient to be configured in the enumeration is either greater than an index of the reference filter coefficient or less than an index of the filter coefficient.

In a second processing method, the information about the filter coefficient further includes indication information indicating that the filter coefficient is greater than or less than the reference filter coefficient. A difference between this processing method and the first processing method is that, in the information about the filter coefficient, in addition to the offset value, a calculation method of the offset value and the first reference filter coefficient may further be indicated. The calculation method may be addition or subtraction, and is defined in detail in specific information about a filter coefficient.

After receiving the information about the filter coefficient, that is, configuration parameters on the network side, UE determines the filter coefficient according to an offset between the reference filter coefficient and the filter coefficient.

Specifically, the determining, based on related information of a measurement object and the information about the at least one filter coefficient, a target filter coefficient to be used for measurement includes choosing, based on a dimension corresponding to the measurement object and a type and a frequency band of a signal to be measured, information about a target filter coefficient from the information about the at least one filter coefficient; and calculating, based on an offset value included in the information about the target filter coefficient and the first reference filter coefficient, the target filter coefficient to be used for measurement.

That is, UE determines, according to whether a cell or a beam is measured, whether a measurement quantity is an RSRP, an RSRQ or an SINR, whether the signal to be measured is a CSI-RS or an SSB, and a frequency band in which a frequency to be measured is located, the target filter coefficient used for the current measurement.

A default configuration parameter is given for each combination in this example. Therefore, when the target filter coefficient is a default filter coefficient, the target filter coefficient is not displayed. When the target filter coefficient is a non-default filter coefficient, index information of the configured target filter coefficient is displayed.

If the configured filter coefficient needs to be the same as the filter coefficient that is configured by default, the configured filter coefficient is not displayed and the filter coefficient that is configured by default is used.

Further, in the foregoing solution in this example, a UE side configures the target filter coefficient based on the configured information about at least one filter coefficient. Certainly, in another manner that may be used, when the information about the filter coefficient configured by the network side is not obtained, a default filter coefficient is used as the target filter coefficient. That is, the related information of a measurement object may be understood as configuration information sent by the network side.

Example 2

The obtaining information about at least one filter coefficient configured by a network side includes obtaining at least one filter coefficient configured by the network side. That is, the network side configures one or more filter coefficient lists for the UE. Optionally, a value of a default filter coefficient in the filter coefficient list is given.

The determining, based on related information of a measurement object and the information about the at least one filter coefficient, a target filter coefficient to be used for measurement includes choosing, from the at least one filter coefficient based on identifier information of the measurement object, a target filter coefficient to be used for measurement. That is, for each measurement configuration, a measurement id is associated with one filter coefficient list and a filter coefficient in the filter coefficient list by using an index. If the filter coefficient to be associated is equal to the value of the default filter coefficient, the configuration of the filter coefficient is omitted. Otherwise, an index of the configured filter coefficient is displayed.

Same as that in Example 1, the determining, based on related information of a measurement object and the information about the at least one filter coefficient, a target filter coefficient to be used for measurement may further be receiving configuration information sent by the network side, where a target filter coefficient is determined based on the configuration information when the target filter coefficient is indicated in the configuration information; or a default filter coefficient is used as a target filter coefficient when the target filter coefficient is not indicated in the configuration information. That is, the related information of a measurement object may be understood as the configuration information sent by the network side. That is, this example also provides a scenario in which the target filter coefficient is determined based on an indication of the network side. If the network side does not give the indication, a default value may be used for processing.

Example 3

A second reference filter coefficient configured by the network side is obtained. That is, a reference filter coefficient configured by the network side is received.

The obtaining information about at least one filter coefficient configured by a network side includes obtaining at least one factor or offset value corresponding to each of at least one dimension configured by the network side.

For example, at least one of the following may be used:

For a dimension of <cell, beam>, two factors or offsets are configured respectively.

For a dimension of <RSRP, RSRQ, SINR>, three factors or offsets are configured respectively.

For a dimension of <CSI-SR, SSB>, two factors or offsets are configured respectively.

For frequencies, for example, <low frequency, intermediate frequency, high frequency, and ultra high frequency>, n factors or offsets are configured respectively. n depends on the allocation of frequencies. For example, n is equal to 4 in the foregoing example. If frequencies are categorized into <low frequency, intermediate frequency, high frequency>, n=3. frequencies are categorized into <low frequency, high frequency>, n=2.

The determining, based on related information of a measurement object and the information about the at least one filter coefficient, a target filter coefficient to be used for measurement includes choosing a target factor or target offset based on dimension information corresponding to the measurement object; and calculating, based on the chosen target factor or target offset, the target filter coefficient to be used for measurement.

The calculating, based on the chosen target factor or target offset, the target filter coefficient to be used for measurement includes, when the target factor is chosen, multiplying the second reference filter coefficient by the target factor to obtain the target filter coefficient to be used for measurement and, when the target offset is chosen, adding the second reference filter coefficient to the target offset to obtain the target filter coefficient to be used for measurement.

According to the <cell, beam>, <RSRP, RSRQ, SINR>, <CSI-SR, SSB>, and frequency point formation of the measurement object required by the measurement configuration, factors or offsets of different frequencies are obtained, and a filter coefficient is calculated.

In the case of a factor, the filter coefficient=the reference filter coefficient*factors corresponding to all items.

In the case of an offset, the filter coefficient=the reference filter coefficient+offsets corresponding to all items.

All the foregoing examples may include the following processing steps: when the target filter coefficient is a default filter coefficient, skipping displaying the target filter coefficient; or when the target filter coefficient is a non-default filter coefficient, displaying index information of the configured target filter coefficient.

As can be seen, by means of the foregoing solution, UE can obtain information about a plurality of filter coefficients configured by a network side. In this way, when the UE needs to be measured, the UE can determine a target filter coefficient based on the information about the plurality of filter coefficients, thereby reducing the signaling load of configuration of filter coefficients when the UE needs to be measured.

Embodiment 2

This embodiment of the present invention provides a method for configuring measurement parameters of UE, applied to a network device. The method includes: configuring information about at least one filter coefficient for UE, where the at least one filter coefficient includes at least information about a default filter coefficient. That is, in this embodiment of the present invention, information about a plurality of filter coefficients can be configured on a network side, so that a target filter coefficient to be used is chosen from the information about the plurality of filter coefficients.

The solution provided in this embodiment is specifically described below by using various examples.

Example 1

The at least one filter coefficient includes at least information about a default filter coefficient.

The method further includes: configuring at least one first reference filter coefficient for the UE. It can be understood that each first reference filter coefficient may be set in a plurality of dimensions included in this embodiment. For example, one first reference filter coefficient may be set in each dimension. In this embodiment, dimensions of frequencies may include a low frequency, an intermediate frequency, a high frequency, and an ultra high frequency. Correspondingly, first reference filter coefficients are set in the four dimensions. In addition, the first reference filter coefficients may be different.

In this embodiment, according to frequencies, dimensions of the information about the plurality of filter coefficients include a plurality of grades such as a low frequency, an intermediate frequency, a high frequency, and an ultra high frequency. Different filter coefficients are separately configured and used in three grades, that is, a low frequency, an intermediate frequency, and a high frequency. That is, different filter coefficients correspond to different frequency dimensions, and a plurality of filter coefficients may be set according to different frequencies in each frequency dimension.

The configuring information about at least one filter coefficient for UE includes: configuring information about a filter coefficient corresponding to each of at least one dimension for the UE, where the information about the filter coefficient further includes an offset value of the filter coefficient relative to the reference filter coefficient. That is, in the information about the at least one filter coefficient in each dimension, information about each filter coefficient may include the offset value and a first reference filter coefficient that corresponds to the offset value. Certainly, a specific reference filter coefficient may be alternatively not indicated, and a first reference filter coefficient corresponding to each dimension is used to correspond to the offset value by default.

It can be understood that dimension classification methods provided in this example may further include configuring corresponding information about a filter coefficient respectively according to several dimensions for example, <cell, beam>, <RSRP, RSRQ, SINR>, <CSI-SR, SSB>, and <low frequency, intermediate frequency, high frequency, and ultra high frequency>, and the information about the filter coefficient is an offset value of the filter coefficient to be configured relative to the reference filter coefficient.

The default processing method of the foregoing offset value and the first reference filter coefficient may include:

In a first processing method, the offset value may be added to the first reference filter coefficient by default, or may be subtracted from the first reference filter coefficient by default. Certainly, there may be other calculation methods, which are not enumerated herein. That is, an index of the filter coefficient to be configured in the enumeration is either greater than an index of the reference filter coefficient or less than an index of the filter coefficient.

In a second processing method, the information about the filter coefficient further includes indication information indicating that the filter coefficient is greater than or less than the reference filter coefficient. A difference between this processing method and the first processing method is that, in the information about the filter coefficient, in addition to the offset value, a calculation method of the offset value and the first reference filter coefficient may further be indicated. The calculation method may be addition or subtraction, and is defined in detail in specific information about a filter coefficient.

After receiving the information about the filter coefficient, that is, configuration parameters on the network side, UE determines the filter coefficient according to an offset between the reference filter coefficient and the filter coefficient.

A default configuration parameter is given for each combination in this example. Therefore, when the target filter coefficient is a default filter coefficient, the target filter coefficient is not displayed. When the target filter coefficient is a non-default filter coefficient, index information of the configured target filter coefficient is displayed.

If the configured filter coefficient needs to be the same as the filter coefficient that is configured by default, the configured filter coefficient is not displayed and the filter coefficient that is configured by default is used.

Example 2

The configuring information about at least one filter coefficient for UE includes: configuring at least one filter coefficient for the UE. That is, the network side configures one or more filter coefficient lists for the UE. Optionally, a value of a default filter coefficient in the filter coefficient list is given.

The determining, based on related information of a measurement object and the information about the at least one filter coefficient, a target filter coefficient to be used for measurement includes choosing, from the at least one filter coefficient based on identifier information of the measurement object, a target filter coefficient to be used for measurement.

That is, for each measurement configuration, a measurement id is associated with one filter coefficient list and a filter coefficient in the filter coefficient list by using an index. If the filter coefficient to be associated is equal to the value of the default filter coefficient, the configuration of the filter coefficient is omitted. Otherwise, an index of the configured filter coefficient is displayed.

Example 3

The method further includes configuring a second reference filter coefficient for the UE, that is, configuring a reference filter coefficient.

The configuring information about at least one filter coefficient for UE includes configuring at least one factor or offset value corresponding to each of at least one dimension for the UE.

For example, at least one of the following may be used:

For a dimension of <cell, beam>, two factors or offsets are configured respectively. For a dimension of <RSRP, RSRQ, SINR>, three factors or offsets are configured respectively.

For a dimension of <CSI-SR, SSB>, two factors or offsets are configured respectively. For frequencies, for example, <low frequency, intermediate frequency, high frequency, and ultra high frequency>, n factors or offsets are configured respectively. n depends on the allocation of frequencies. For example, n is equal to 4 in the foregoing example. If frequencies are categorized into <low frequency, intermediate frequency, high frequency>, n=3. If frequencies are categorized into <low frequency, high frequency>, n=2.

The determining, based on related information of a measurement object and the information about the at least one filter coefficient, a target filter coefficient to be used for measurement includes choosing a target factor or target offset based on dimension information corresponding to the measurement object, and calculating, based on the chosen target factor or target offset, the target filter coefficient to be used for measurement.

The calculating, based on the chosen target factor or target offset, the target filter coefficient to be used for measurement includes when the target factor is chosen, multiplying the second reference filter coefficient by the target factor to obtain the target filter coefficient to be used for measurement, and, when the target offset is chosen, adding the second reference filter coefficient to the target offset to obtain the target filter coefficient to be used for measurement.

According to the <cell, beam>, <RSRP, RSRQ, SINR>, <CSI-SR, SSB>, and frequency point formation of the measurement object required by the measurement configuration, factors or offsets of different frequencies are obtained, and a filter coefficient is calculated.

In the case of a factor, the filter coefficient=the reference filter coefficient*factors corresponding to all items.

In the case of an offset, the filter coefficient=the reference filter coefficient+offsets corresponding to all items.

All the foregoing examples may include the following processing steps: when the target filter coefficient is a default filter coefficient, skipping displaying the target filter coefficient; or when the target filter coefficient is a non-default filter coefficient, displaying index information of the configured target filter coefficient.

As can be seen, by means of the foregoing solution, UE can obtain information about a plurality of filter coefficients configured by a network side. In this way, when the UE needs to be measured, the UE can determine a target filter coefficient based on the information about the plurality of filter coefficients, thereby reducing the signaling load of configuration of filter coefficients when the UE needs to be measured.

Embodiment 3

Figure 2:
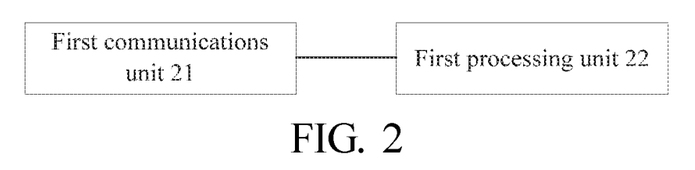
FIG. 2 is a schematic structural diagram of UE according to an embodiment of the present invention.

This embodiment of the present invention provides UE. As shown in FIG. 2, the UE includes a first communications unit 21, configured to obtain information about at least one filter coefficient configured by a network side, and a first processing unit 22, configured to determine, based on related information of a measurement object and the information about the at least one filter coefficient, a target filter coefficient to be used for measurement.

That is, in this embodiment of the present invention, information about a plurality of filter coefficients can be configured on a network side, so that a target filter coefficient to be used is chosen from the information about the plurality of filter coefficients.

The solution provided in this embodiment is specifically described below by using various examples.

Example 1

The at least one filter coefficient includes at least information about a default filter coefficient.

The first communications unit 21 is configured to obtain at least one first reference filter coefficient configured by the network side. It can be understood that each first reference filter coefficient may be set in a plurality of dimensions included in this embodiment. For example, one first reference filter coefficient may be set in each dimension. In this embodiment, dimensions of frequencies may include a low frequency, an intermediate frequency, a high frequency, and an ultra high frequency. Correspondingly, first reference filter coefficients are set in the four dimensions. In addition, the first reference filter coefficients may be different.

In this embodiment, according to frequencies, dimensions of the information about the plurality of filter coefficients include a plurality of grades such as a low frequency, an intermediate frequency, a high frequency, and an ultra high frequency. Different filter coefficients are separately configured and used in three grades, that is, a low frequency, an intermediate frequency, and a high frequency. That is, different filter coefficients correspond to different frequency dimensions, and a plurality of filter coefficients may be set according to different frequencies in each frequency dimension.

The first communications unit 21 is configured to obtain information about a filter coefficient corresponding to each of at least one dimension configured by the network side, where the information about the filter coefficient further includes: an offset value of the filter coefficient relative to the first reference filter coefficient. That is, in the information about the at least one filter coefficient in each dimension, information about each filter coefficient may include the offset value and a first reference filter coefficient that corresponds to the offset value. Certainly, a specific reference filter coefficient may be alternatively not indicated, and a first reference filter coefficient corresponding to each dimension is used to correspond to the offset value by default.

It can be understood that dimension classification methods provided in this example may further include configuring corresponding information about a filter coefficient respectively according to several dimensions for example, <cell, beam>, <RSRP, RSRQ, SINR>, <CSI-SR, SSB>, and <low frequency, intermediate frequency, high frequency, and ultra high frequency>, and the information about the filter coefficient is an offset value of the filter coefficient to be configured relative to the reference filter coefficient.

The default processing method of the foregoing offset value and the first reference filter coefficient may include:

In a first processing method, the offset value may be added to the first reference filter coefficient by default, or may be subtracted from the first reference filter coefficient by default. Certainly, there may be other calculation methods, which are not enumerated herein. That is, an index of the filter coefficient to be configured in the enumeration is either greater than an index of the reference filter coefficient or less than an index of the filter coefficient.

In a second processing method, the information about the filter coefficient further includes indication information indicating that the filter coefficient is greater than or less than the reference filter coefficient. A difference between this processing method and the first processing method is that, in the information about the filter coefficient, in addition to the offset value, a calculation method of the offset value and the first reference filter coefficient may further be indicated. The calculation method may be addition or subtraction, and is defined in detail in specific information about a filter coefficient.

After receiving the information about the filter coefficient, that is, configuration parameters on the network side, UE determines the filter coefficient according to an offset between the reference filter coefficient and the filter coefficient.

Specifically, the first processing unit 22 is configured to choose, based on a dimension corresponding to the measurement object and a type and a frequency band of a signal to be measured, information about a target filter coefficient from the information about the at least one filter coefficient, and calculate, based on an offset value included in the information about the target filter coefficient and the first reference filter coefficient, the target filter coefficient to be used for measurement.

That is, UE determines, according to whether a cell or a beam is measured, whether a measurement quantity is an RSRP, an RSRQ or an SINR, whether the signal to be measured is a CSI-RS or an SSB, and a frequency band in which a frequency to be measured is located, the target filter coefficient used for the current measurement.

A default configuration parameter is given for each combination in this example. Therefore, when the target filter coefficient is a default filter coefficient, the target filter coefficient is not displayed. When the target filter coefficient is a non-default filter coefficient, index information of the configured target filter coefficient is displayed.

If the configured filter coefficient needs to be the same as the filter coefficient that is configured by default, the configured filter coefficient is not displayed and the filter coefficient that is configured by default is used.

Further, in the foregoing solution in this example, a UE side configures the target filter coefficient based on the configured information about at least one filter coefficient. Certainly, in another manner that may be used, when the information about the filter coefficient configured by the network side is not obtained, a default filter coefficient is used as the target filter coefficient. That is, the related information of a measurement object may be understood as configuration information sent by the network side.

Example 2

The first communications unit 21 is configured to obtain at least one filter coefficient configured by the network side.

That is, the network side configures one or more filter coefficient lists for the UE.

Optionally, a value of a default filter coefficient in the filter coefficient list is given.

The first processing unit 22 is configured to choose, from the at least one filter coefficient based on identifier information of the measurement object, a target filter coefficient to be used for measurement.

That is, for each measurement configuration, a measurement id is associated with one filter coefficient list and a filter coefficient in the filter coefficient list by using an index. If the filter coefficient to be associated is equal to the value of the default filter coefficient, the configuration of the filter coefficient is omitted. Otherwise, an index of the configured filter coefficient is displayed.

Same as that in Example 1, the determining, based on related information of a measurement object and the information about the at least one filter coefficient, a target filter coefficient to be used for measurement may further be receiving configuration information sent by the network side, where a target filter coefficient is determined based on the configuration information when the target filter coefficient is indicated in the configuration information; or a default filter coefficient is used as a target filter coefficient when the target filter coefficient is not indicated in the configuration information. That is, the related information of a measurement object may be understood as the configuration information sent by the network side. That is, this example also provides a scenario in which the target filter coefficient is determined based on an indication of the network side. If the network side does not give the indication, a default value may be used for processing.

Example 3

A second reference filter coefficient configured by the network side is obtained. That is, a reference filter coefficient configured by the network side is received.

The first communications unit is configured to obtain at least one factor or offset value corresponding to each of at least one dimension configured by the network side.

For example, at least one of the following may be used:

For a dimension of <cell, beam>, two factors or offsets are configured respectively.

For a dimension of <RSRP, RSRQ, SINR>, three factors or offsets are configured respectively.

For a dimension of <CSI-SR, SSB>, two factors or offsets are configured respectively.

For frequencies, for example, <low frequency, intermediate frequency, high frequency, and ultra high frequency>, n factors or offsets are configured respectively. n depends on the allocation of frequencies. For example, n is equal to 4 in the foregoing example. If frequencies are categorized into <low frequency, intermediate frequency, high frequency>, n=3. If frequencies are categorized into <low frequency, high frequency>, n=2.

The first processing unit is configured to choose a target factor or target offset based on dimension information corresponding to the measurement object; and calculate, based on the chosen target factor or target offset, the target filter coefficient to be used for measurement.

The first processing unit is configured to: when the target factor is chosen, multiply the second reference filter coefficient by the target factor to obtain the target filter coefficient to be used for measurement and, when the target offset is chosen, add the second reference filter coefficient to the target offset to obtain the target filter coefficient to be used for measurement.

According to the <cell, beam>, <RSRP, RSRQ, SINR>, <CSI-SR, SSB>, and frequency point formation of the measurement object required by the measurement configuration, factors or offsets of different frequencies are obtained, and a filter coefficient is calculated.

In the case of a factor, the filter coefficient=the reference filter coefficient*factors corresponding to all items.

In the case of an offset, the filter coefficient=the reference filter coefficient+offsets corresponding to all items.

All the foregoing examples may include the following processing steps: when the target filter coefficient is a default filter coefficient, skipping displaying the target filter coefficient; or when the target filter coefficient is a non-default filter coefficient, displaying index information of the configured target filter coefficient.

As can be seen, by means of the foregoing solution, UE can obtain information about a plurality of filter coefficients configured by a network side. In this way, when the UE needs to be measured, the UE can determine a target filter coefficient based on the information about the plurality of filter coefficients, thereby reducing the signaling load of configuration of filter coefficients when the UE needs to be measured.

Embodiment 4

Figure 3:
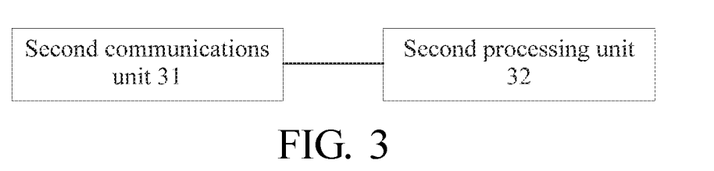
FIG. 3 is a schematic structural diagram of a network device according to an embodiment of the present invention.

This embodiment of the present invention provides a network device. As shown in FIG. 3, the network device includes a second communications unit 31, configured to configure information about at least one filter coefficient for UE, where the at least one filter coefficient includes at least information about a default filter coefficient.

That is, in this embodiment of the present invention, information about a plurality of filter coefficients can be configured on a network side, so that a target filter coefficient to be used is chosen from the information about the plurality of filter coefficients.

The solution provided in this embodiment is specifically described below by using various examples.

Example 1

The at least one filter coefficient includes at least information about a default filter coefficient.

The second communications unit 31 is configured to configure at least one first reference filter coefficient for the UE. It can be understood that each first reference filter coefficient may be set in a plurality of dimensions included in this embodiment. For example, one first reference filter coefficient may be set in each dimension. In this embodiment, dimensions of frequencies may include a low frequency, an intermediate frequency, a high frequency, and an ultra high frequency. Correspondingly, first reference filter coefficients are set in the four dimensions. In addition, the first reference filter coefficients may be different.

In this embodiment, according to frequencies, dimensions of the information about the plurality of filter coefficients include a plurality of grades such as a low frequency, an intermediate frequency, a high frequency, and an ultra high frequency. Different filter coefficients are separately configured and used in three grades, that is, a low frequency, an intermediate frequency, and a high frequency. That is, different filter coefficients correspond to different frequency dimensions, and a plurality of filter coefficients may be set according to different frequencies in each frequency dimension.

The network device further includes a second processing unit 32, configured to determine information about a filter coefficient corresponding to each of at least one dimension, where the second communications unit 31 is configured to configure information about a filter coefficient corresponding to each of at least one dimension for the UE, where the information about the filter coefficient further includes an offset value of the filter coefficient relative to the reference filter coefficient.

That is, in the information about the at least one filter coefficient in each dimension, information about each filter coefficient may include the offset value and a first reference filter coefficient that corresponds to the offset value. Certainly, a specific reference filter coefficient may be alternatively not indicated, and a first reference filter coefficient corresponding to each dimension is used to correspond to the offset value by default.

It can be understood that dimension classification methods provided in this example may further include configuring corresponding information about a filter coefficient respectively according to several dimensions for example, <cell, beam>, <RSRP, RSRQ, SINR>, <CSI-SR, SSB>, and <low frequency, intermediate frequency, high frequency, and ultra high frequency>, and the information about the filter coefficient is an offset value of the filter coefficient to be configured relative to the reference filter coefficient.

The default processing method of the foregoing offset value and the first reference filter coefficient may include:

In a first processing method, the offset value may be added to the first reference filter coefficient by default, or may be subtracted from the first reference filter coefficient by default. Certainly, there may be other calculation methods, which are not enumerated herein. That is, an index of the filter coefficient to be configured in the enumeration is either greater than an index of the reference filter coefficient or less than an index of the filter coefficient.

In a second processing method, the information about the filter coefficient further includes indication information indicating that the filter coefficient is greater than or less than the reference filter coefficient. A difference between this processing method and the first processing method is that, in the information about the filter coefficient, in addition to the offset value, a calculation method of the offset value and the first reference filter coefficient may further be indicated. The calculation method may be addition or subtraction, and is defined in detail in specific information about a filter coefficient.

After receiving the information about the filter coefficient, that is, configuration parameters on the network side, UE determines the filter coefficient according to an offset between the reference filter coefficient and the filter coefficient.

A default configuration parameter is given for each combination in this example. Therefore, when the target filter coefficient is a default filter coefficient, the target filter coefficient is not displayed. When the target filter coefficient is a non-default filter coefficient, index information of the configured target filter coefficient is displayed.

If the configured filter coefficient needs to be the same as the filter coefficient that is configured by default, the configured filter coefficient is not displayed and the filter coefficient that is configured by default is used.

Example 2

The second communications unit 31 is configured to configure at least one filter coefficient for the UE. That is, the network side configures one or more filter coefficient lists for the UE.

Optionally, a value of a default filter coefficient in the filter coefficient list is given.

The determining, based on related information of a measurement object and the information about the at least one filter coefficient, a target filter coefficient to be used for measurement includes choosing, from the at least one filter coefficient based on identifier information of the measurement object, a target filter coefficient to be used for measurement. That is, for each measurement configuration, a measurement id is associated with one filter coefficient list and a filter coefficient in the filter coefficient list by using an index. If the filter coefficient to be associated is equal to the value of the default filter coefficient, the configuration of the filter coefficient is omitted. Otherwise, an index of the configured filter coefficient is displayed.

Example 3

The second communications unit 31 is configured to configure a second reference filter coefficient for the UE, that is, configure a reference filter coefficient.

The second communications unit 31 is configured to configure at least one factor or offset value corresponding to each of at least one dimension for the UE.

For example, at least one of the following may be used:

For a dimension of <cell, beam>, two factors or offsets are configured respectively.

For a dimension of <RSRP, RSRQ, SINR>, three factors or offsets are configured respectively.

For a dimension of <CSI-SR, SSB>, two factors or offsets are configured respectively.

For frequencies, for example, <low frequency, intermediate frequency, high frequency, and ultra high frequency>, n factors or offsets are configured respectively. n depends on the allocation of frequencies. For example, n is equal to 4 in the foregoing example. If frequencies are categorized into <low frequency, intermediate frequency, high frequency>, n=3. If frequencies are categorized into <low frequency, high frequency>, n=2.

The determining, based on related information of a measurement object and the information about the at least one filter coefficient, a target filter coefficient to be used for measurement includes choosing a target factor or target offset based on dimension information corresponding to the measurement object, and calculating, based on the chosen target factor or target offset, the target filter coefficient to be used for measurement.

The calculating, based on the chosen target factor or target offset, the target filter coefficient to be used for measurement includes when the target factor is chosen, multiplying the second reference filter coefficient by the target factor to obtain the target filter coefficient to be used for measurement, and, when the target offset is chosen, adding the second reference filter coefficient to the target offset to obtain the target filter coefficient to be used for measurement.

According to the <cell, beam>, <RSRP, RSRQ, SINR>, <CSI-SR, SSB>, and frequency point formation of the measurement object required by the measurement configuration, factors or offsets of different frequencies are obtained, and a filter coefficient is calculated.

In the case of a factor, the filter coefficient=the reference filter coefficient*factors corresponding to all items.

In the case of an offset, the filter coefficient=the reference filter coefficient+offsets corresponding to all items.

All the foregoing examples may include the following processing steps: when the target filter coefficient is a default filter coefficient, skipping displaying the target filter coefficient; or when the target filter coefficient is a non-default filter coefficient, displaying index information of the configured target filter coefficient.

As can be seen, by means of the foregoing solution, UE can obtain information about a plurality of filter coefficients configured by a network side. In this way, when the UE needs to be measured, the UE can determine a target filter coefficient based on the information about the plurality of filter coefficients, thereby reducing the signaling load of configuration of filter coefficients when the UE needs to be measured.

Figure 4:
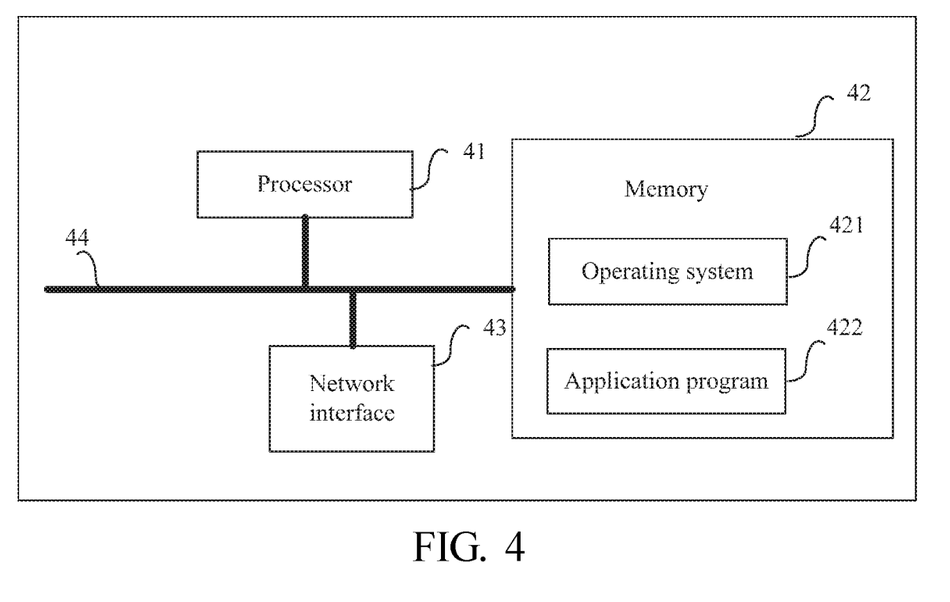
FIG. 4 is a schematic diagram of a hardware architecture according to an embodiment of the present invention.

An embodiment of the present invention further provides UE or a hardware architecture of a receiver device, which, as shown in FIG. 4, includes: at least one processor 41, a memory 42, and at least one network interface 43. The components are coupled together through a bus system 44. It may be understood that, the bus system 44 is configured to implement connection and communication between the components. In addition to a data bus, the bus system 44 further includes a power bus, a control bus, and a status signal bus. However, for ease of clear description, all types of buses in FIG. 4 are marked as the bus system 44.

It may be understood that the memory 42 in this embodiment of the present invention may be a volatile memory or a nonvolatile memory, or may include a volatile memory and a nonvolatile memory.

In some implementations, the memory 42 stores the following elements, executable modules or data structures, or a subset thereof, or an extended set thereof: an operating system 421 and an application program 422. The processor 41 is configured to process the steps of the method in the foregoing Embodiment 1 or 2. Details are not described herein again.

An embodiment of the present invention provides a computer storage medium, the computer storage medium storing a computer executable instruction, where the computer executable instruction is executed to perform the steps of the method according to Embodiment 1 or 2.

When implemented in a form of a software functional module and sold or used as an independent product, the forgoing apparatus in the embodiments of the present invention may be alternatively stored in a computer readable storage medium. Based on such an understanding, the technical solutions of the embodiments of the present invention essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present invention. The foregoing storage medium includes: any medium that can store program code, such as a USB flash drive, a removable hard disk, a read-only memory (ROM), a magnetic disk, or a compact disc. In this way, the embodiments of the present invention are not limited to any specific combination of hardware and software.

Correspondingly, an embodiment of the present invention further provides a computer storage medium storing a computer program, and the computer program is configured to perform the data scheduling method in the embodiments of the present invention.

Although the preferred embodiments of the present invention have been disclosed for purposes of illustration, a person skilled in the art will appreciate that various modifications, additions and substitutions are also possible. Therefore, the scope of the present invention shall not be limited to the embodiments described above.

What is claimed is:

1. A method for configuring measurement parameters of user equipment (UE), applied to the UE, comprising:
   obtaining at least one factor or offset value corresponding to each of at least one dimension configured by a network side; and
   choosing a target factor or target offset based on dimension information corresponding to a measurement object; and calculating, based on the chosen target factor or target offset, a target filter coefficient to be used for measurement.

2. The method of claim 1 wherein the method further comprises:
   obtaining a reference filter coefficient configured by the network side;
   wherein calculating, based on the chosen target factor or target offset, the target filter coefficient to be used for measurement comprises:
   when the target factor is chosen, multiplying the reference filter coefficient by the target factor to obtain the target filter coefficient to be used for measurement and, when the target offset is chosen, adding the reference filter coefficient to the target offset to obtain the target filter coefficient to be used for measurement.

3. A user equipment (UE) comprising:
   a communications interface;
   a memory configured to store computer-executable instructions; and
   one or more processors in communication with the memory and configured to execute the computer-executable instructions to at least:
   obtain at least one factor or offset value corresponding to each of at least one dimension configured by a network side; and
   choose a target factor or target offset based on dimension information corresponding to a measurement object and calculate, based on the chosen target factor or target offset, a target filter coefficient to be used for measurement.

4. The UE of claim 3 wherein the computer-executable instructions further configure the one or more processors to:
   obtain a reference filter coefficient configured by the network side;
   when the target factor is chosen, multiply the reference filter coefficient by the target factor to obtain the target filter coefficient to be used for measurement and, when the target offset is chosen, add the reference filter coefficient to the target offset to obtain the target filter coefficient to be used for measurement.

5. A non-transitory computer-readable storage medium storing computer-executable instructions that, when executed by a computer system, configure the computer system to perform operations comprising:

obtaining at least one factor or offset value corresponding to each of at least one dimension configured by a network side; and choosing a target factor or target offset based on dimension information corresponding to a measurement object; and calculating, based on the chosen target factor or target offset, the target filter coefficient to be used for measurement.

6. The non-transitory computer-readable storage medium of claim 5, wherein the operations further comprise:

obtaining a reference filter coefficient configured by the network side;

wherein calculating, based on the chosen target factor or target offset, the target filter coefficient to be used for measurement comprises:

when the target factor is chosen, multiplying the reference filter coefficient by the target factor to obtain the target filter coefficient to be used for measurement and, when the target offset is chosen, adding the reference filter coefficient to the target offset to obtain the target filter coefficient to be used for measurement.

\* \* \* \* \*